United States Patent [19]
Uematsu

[11] Patent Number: 5,874,183
[45] Date of Patent: Feb. 23, 1999

[54] MOLTEN CARBONATE FUEL CELL AND POWER GENERATION SYSTEM INCLUDING THE SAME

[75] Inventor: Hiroyoshi Uematsu, Yokohama, Japan

[73] Assignee: Ishikawajima-Harima Heavy Industries Co., Ltd., Tokyo, Japan

[21] Appl. No.: 768,073

[22] Filed: Dec. 16, 1996

[30] Foreign Application Priority Data

Mar. 25, 1996 [JP] Japan .................................... 8-067656

[51] Int. Cl.$^6$ .................................................. H01M 8/14
[52] U.S. Cl. ................................ 429/34; 429/16; 429/27; 429/46
[58] Field of Search ................................ 429/16, 27, 46, 429/34, 103

[56] References Cited

U.S. PATENT DOCUMENTS

| 2,830,109 | 4/1958 | Justi et al. ................................. 429/16 |
| 3,146,131 | 8/1964 | Linden et al. . |
| 3,488,221 | 1/1970 | Shimotake et al. ..................... 429/103 |
| 3,617,385 | 11/1971 | Gray . |
| 3,718,506 | 2/1973 | Fischer et al. . |
| 4,548,876 | 10/1985 | Bregoli ..................................... 429/40 |
| 4,647,516 | 3/1987 | Matsumura et al. . |
| 5,660,941 | 8/1997 | Farooopue et al. ....................... 429/19 |

FOREIGN PATENT DOCUMENTS

| 14 96 101 | 6/1969 | Germany . |
| A-8-088016 | 4/1996 | Japan . |
| A-8-096828 | 4/1996 | Japan . |
| A-8-148178 | 6/1996 | Japan . |
| 1 092 213 | 1/1967 | United Kingdom . |
| 91 11034 | 7/1991 | WIPO . |

OTHER PUBLICATIONS

Energy Conversion, vol. 12, Dec. 1972 pp. 131–138, p002034692 "Cell Assemblies for a Molten Carbonate Fuel Battery–I. The Construction of Call Assemblies" by H.E. Huynink.

*Primary Examiner*—Maria Nuzzolillo
*Assistant Examiner*—Carol Chaney
*Attorney, Agent, or Firm*—Griffin, Butler, Whisenhunt & Szipl, LLP

[57] ABSTRACT

The molten carbonate fuel cell includes (a) an anode current collector formed to be flat rectangular tubular and having a pair of outer surfaces each formed at the center thereof with a recessed portion for receiving an anode therein, the recessed portion being formed with a plurality of holes through which anode gas is supplied to anode from inside of the anode current collector, (b) a pair of cells each disposed on each of the outer surfaces of the anode current collector, and (c) a pair of cathode current collectors each cooperating with the anode current collector to sandwich each of the cells, therebetween, the cathode current collectors being formed with a plurality of holes through which cathode gas is supplied to cathode from outside of the cathode current collector. The anode current collector, the cells and the cathode current collectors constitute a pair of independent parallel cells. The anode current collector includes an anode gas passage which is connected to the anode current collector and through which an anode gas is to be provided to the inside of the anode current collector, and an anode current terminal formed at an end of the anode current collector perpendicular to the anode gas flow. Each of the cells includes an anode set in the recessed portion of the anode current collector, an electrolyte plate disposed in contact with an outer surface of the anode and extensive over the recessed portion of the anode current collector, and a cathode disposed in contact with an outer surface of the electrolyte plate. The cathode current collectors is connected to each other at ends disposed opposite to the anode current terminal to form ⊐ shape, and the cathode current collector is formed at a connection point as a cathode current terminal. The above mentioned molten carbonate fuel cell makes it no longer necessary to use a separator for mechanically separating anode and cathode gases, resulting in remarkable cost down.

19 Claims, 7 Drawing Sheets

MOLTEN CARBONATE FUEL CELL AND POWER GENERATION SYSTEM INCLUDING THE SAME

BACKGROUND OF THE INVENTION

1. Field of the Invention

The invention relates to a molten carbonate fuel cell and a power generation system including the molten carbonate fuel cell.

2. Description of the Related Art

A molten carbonate fuel cell has many advantages in comparison with conventional power generation systems. For instance, it provides higher efficiency and less pollution to environment. Thus, the molten carbonate fuel cell has been studied and developed in many countries all over the world as a next power generation system following hydraulic, thermal and nuclear power generation.

Figure 1:
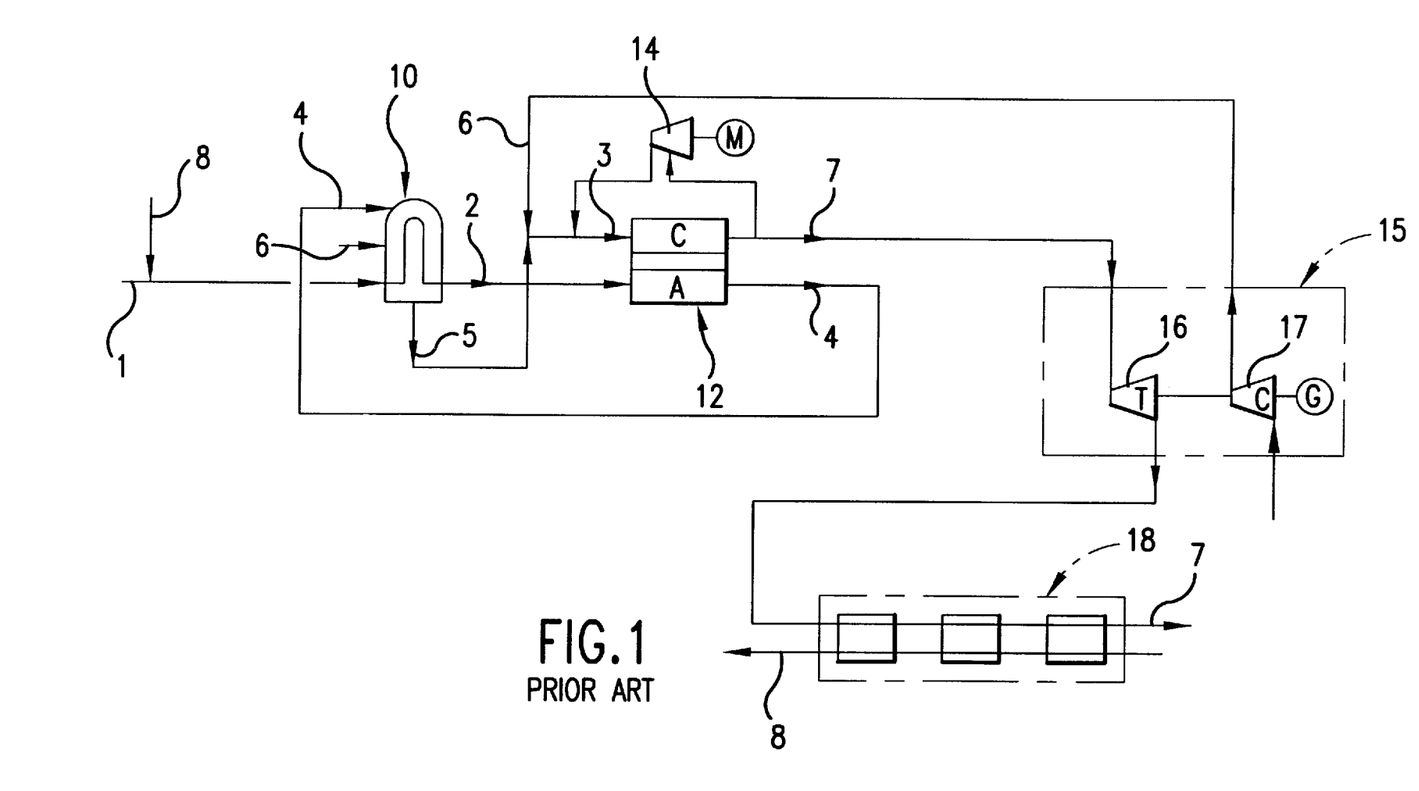
FIG. 1 is a schematic view illustrating a conventional power generation system including a molten carbonate fuel cell.

FIG. 1 illustrates one of conventional MCFC power generation systems consuming natural gas as fuel. The illustrated power generation system includes a reformer 10 for reforming fuel gas 1 such as natural gas into anode gas 2 containing hydrogen gas therein, and a molten carbonate fuel cell 12 for producing electric power from the anode gas 2 and cathode gas 3 containing oxygen and $CO_2$. The anode gas 2 produced in the reformer 10 is supplied to the fuel cell 12, and consumed the most part, for instance, about 80% for power generation reaction of MCFC to thereby transform into anode exhaust gas 4, which is supplied to a combustion chamber of the reformer 10. In the reformer 10, combustible ingredients in the anode exhaust gas 4 such as hydrogen, carbon monoxide and methane are burned to produce high temperature combustion gas by which a reforming tube is heated to thereby reform fuel passing through the reforming tube. Combustion exhaust gas 5 leaving the reformer 10 joins pressurized air 6 supplied from a pressure recovery device 15 to thereby produce cathode gas 3, which supplies requisite carbon dioxide and oxygen to a cathode section C of the fuel cell 12. The cathode gas 3 makes partial reaction for power generation in the fuel cell 12 to thereby produce cathode exhaust gas 7, a part of which is circulated to the upstream of the fuel cell 12 by means of a cathode recirculation blower 14 and remainder of which is pressure-recovered by means of a pressure recovery apparatus 15 including a turbine 16 and an air-compressor 17 and also heat-recovered by means, of a heat recovery apparatus 18, and then exhausted to atmosphere. Before entering the reformer 10, the fuel gas 1 is mixed with steam 8.

Figure 2A:
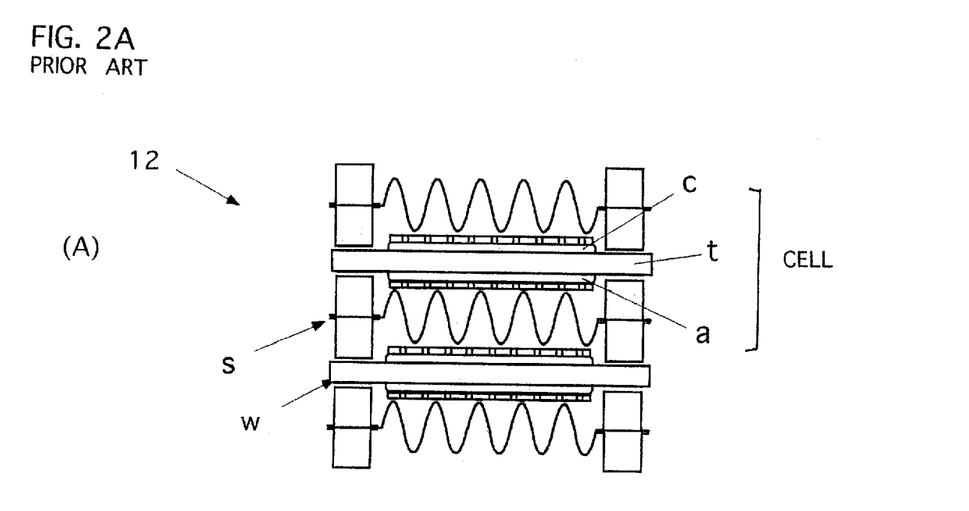
FIGS. 2A and 2B are schematic views each illustrating a conventional molten carbonate fuel cell.
Figure 2B:
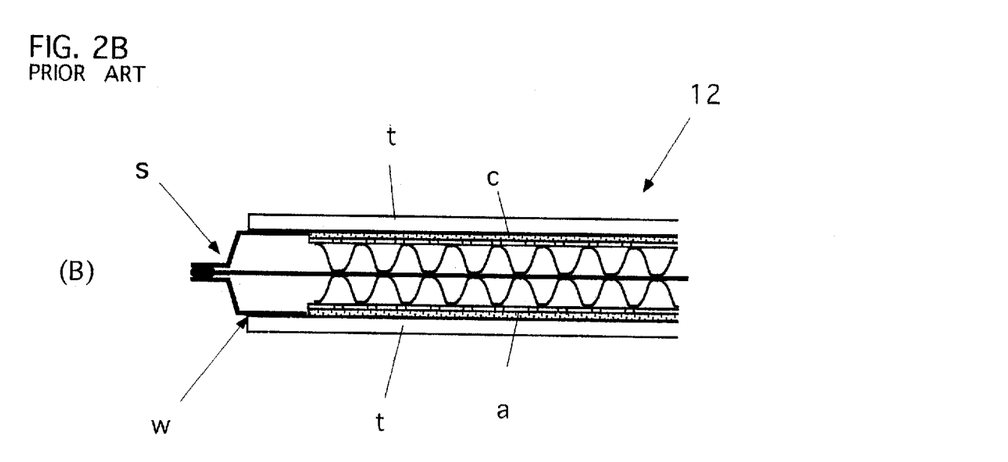

FIGS. 2A and 2B schematically illustrate mechanical structure of the fuel cell 12. As illustrated, the molten carbonate fuel cell 12 includes electrolyte plate t, a set of anode, a and cathode c each disposed on one of opposite surface of each of the electrolyte plate t, and separators s for mechanically separating the anode and cathode gas. The electrolyte plate t is a planar plate made of ceramic powder, and holds carbonate in gaps therein with the carbonate being molten at high temperature. The anode a and cathode c both made of sintered metal powder and formed in a planar plate sandwich the electrolyte plate t therebetween. The anode a, electrolyte plate t, and cathode c form a single cell. The molten carbonate fuel cell 12 is comprised of a plurality of cells forming a layer-stacked cell in which the cells are sandwiched between the separators s.

That is, a single cell is comprised of the planar electrolyte plate t sandwiched between the anode a and the cathode c, a current collector made of a punched plate and supporting, the electrolode plate for protection, and the separator s made of metal and disposed outside the current collector. In an internal manifold type fuel cell, the separators s form passages through which fuel gas and oxidant gas are supplied to anode and cathode. In a layer-stacked cell, the separators s makes possible to stack a plurality of cells and make them integrated with one another. It should be noted that various types of separator have been manufactured for obtaining proper function thereof. For instance, one of conventional separators is comprised of a flat plate combined with corrugate plates or pressed plate. FIG. 2A illustrates a separator comprised of pressed plates, whereas FIG. 2B illustrates a separator comprised of a flat plate combined with corrugate plates.

The above, mentioned conventional molten carbonate fuel cell has problems as follows.

First, a separator in a conventional molten carbonate fuel cell is required to have high accuracy, high electrical conductivity and high corrosion resistance in order to have many functions of: forming a passage through which fuel gas and oxidant gas is supplied to an anode and a cathode; preventing those two gases from mixing with each other; having electrical conductivity; and forming wet seal w illustrated in FIG. 2B by making direct contact with a highly corrosive electrolyte plate at high temperature. As a result, a separator is complicated in structure and costs too much for fabrication.

Secondly, it is not possible to exchange one of stacked cells, even if it is inferior, since a lot of cells are integrally stacked to use as a layer-stacked cell. Electrolyte is decreased by corrosion and evaporation at 550°~700° C. which results in shorter lifetime of a cell. However, it is quite difficult to supplement electrolyte to a cell because of the stacked structure.

In a power generation system including the conventional fuel cell, an overall structure thereof is too complicated and large in size, and thus the power generation system costs too much.

SUMMARY OF THE INVENTION

In view of the above discussed problems of the conventional fuel cell, it is an object of the present invention, to provide a molten carbonate fuel cell capable of making a cell at low cost without using a high cost separator.

Another object of the present invention is to provide a molten carbonate fuel cell capable of exchanging each of cells and supplementing electrolyte to a cell.

A further object of the present invention is to provide a power generation system using the above mentioned fuel cell to make a fuel cell and a reformer integrated with each other to thereby make the power generation system simple and compact in structure and reduce fabrication cost thereof.

There is provided a molten carbonate fuel cell including an anode current collector formed to be flat rectangular tubular a pair of opposite outer surfaces each formed at the center thereof with a recessed portion for receiving an anode therein, the recessed portion being formed with a plurality of holes through which anode gas is supplied to anode from inside of the anode current collector, a pair of cells each disposed on each of the outer surfaces of the anode current collector, and a pair of cathode current collectors each cooperating with the anode current collector to sandwich each of the cells therebetween, the cathode current collectors being formed with a plurality of holes through which cathode gas is supplied to cathode from outside of the cathode current collector. The anode current collector, the cells and the cathode current collectors constitute a pair of independent parallel cells. The anode current collector is connected to an anode gas passage through which an anode gas is to be provided to the inside of the anode current collector, and an anode current terminal is formed at an end of the anode current collector perpendicular to the anode gas flow. Each of the cells includes a pair of anodes each set in the recessed portion of the anode current collector, a pair of electrolyte plates each disposed in contact with an outer surface of each of the anodes and extensive over the recessed portion of the anode current collector, and a pair of cathodes each disposed in contact with an outer surface of each of the electrolyte plates. The cathode current collectors is connected to each other at ends disposed opposite to the anode current terminal to form ⊐ shape, and the cathode current collector is formed at a connection point as a cathode current terminal.

In accordance with the above mentioned fuel cell, a pair of cells each including an anode, an electrolyte plate, and a cathode are sandwiched between a single, flat rectangular tubular anode current collector and a pair of cathode current collectors to thereby constitute a pair of independent parallel cells. Anode gas is supplied inside the anode current collector, and cathode gas is supplied outside the cathode current collector. Accordingly, the tubular anode current collector itself in cooperating with electrolyte plate has a function not to mix those two gases with each other, and hence it is no longer necessary to use a separator unlike a conventional fuel cell. In addition, since the anode current collector in cooperating with electrolyte plate has a function of separately supplying those two gases to inside and outside thereof, it is no longer necessary to use an internal manifold unlike a conventional fuel cells. Thus, it is now possible to construct a cell in relatively, simple structure at low cost without using, a separator which would increase fabrication cost.

Each a pair of parallel cells is mechanically independent and removable because each pair is connected to other by an anode current terminal and a cathode current terminal. Thus, even after temperature is raised and thus a electrolyte plate is molten to thereby form a wet seal, it is possible to readily exchange a pair of parallel cells to another by unfastening the terminal. In addition, it is possible to supplement electrolyte to each of cells through holes of a cathode current collector when a pair of parallel cells is to be exchanged.

In a preferred embodiment, the recessed portion of the anode current collector is flat and rectangular in shape, and the anode has the same shape to completely fit into the recessed portion. This embodiment makes it possible to sandwich the electrolyte plate without any gaps causing crack of the electrolyte plate.

In another preferred embodiment, the anode current collector and the cathode current collector are made by pressing a thin metal plate. This embodiment makes it possible to fabricate anode and cathode current collectors at lower cost.

In still another preferred embodiment, the molten carbonate fuel cell further includes reforming catalyst filled in the anode current collector. This embodiment makes it possible to reform fuel gas into hydrogen containing anode gas in the anode current collector by means of the reforming catalyst, thereby providing an internal reforming type fuel cell. Though it is impossible to exchange catalyst in a conventional internal reforming type fuel cell, it is possible to exchange reforming catalyst in the present invention. It is preferable that the reforming catalyst is shaped so as to act as a reinforcement for the anode current collector durable for clamping pressure. It is not always necessary for the reforming catalyst to be continual in a gas flow direction.

In yet another preferred embodiment, the anode current collector is rectangular in shape. It is preferable that the anode and cathode current collectors are made of material having high corrosion resistance and electrical conductivity. The anode current collector may be filled with heat insulating material except the anode gas passage.

There is further provided a molten carbonate fuel cell including a plurality of parallel cells, and a plurality of electric insulating spaces. The parallel cells are stacked one on another with the insulating spacer being sandwiched between the parallel cells. Herein, each of the parallel cells is comprised as mentioned above. The molten carbonate fuel cell makes it possible to produce higher voltage by connecting many cells in series in comparison with each of cells independently disposed in every pair of the parallel cells.

In preferred embodiment, the parallel cells are arranged so that an anode current terminal of a parallel cell is connected to a cathode current terminal of an adjacent parallel cell and a cathode current terminal of the parallel cell is connected to an anode current terminal of another adjacent parallel cell. Namely, it is preferable that the anode and cathode current terminals are vertically disposed alternately in opposite directions. This embodiment makes it possible to readily connect vertically arranged current terminals each other.

There is still further provided a power generation system having a molten carbonate fuel cell, including (a) a plurality of independent parallel cells each including an anode current collector formed to be flat rectangular tubular and having a pair of outer surfaces each formed at the center thereof with a recessed portion for receiving an anode therein, the recessed portion being formed with a plurality of holes through which anode gas is supplied to anode from for communicating inside of the anode current collector, a pair of cells each disposed on each of the outer surfaces of the anode current collector, and a pair of cathode current collectors each cooperating with the anode current collector to sandwich each of the cells therebetween, the cathode current collectors being, formed with a plurality of holes through which cathode gas is supplied to cathode from outside of the cathode current collector to outside, (b) a reformer including reforming catalyst in an anode gas intake passage which is connected to the inside of the anode current collector, (c) a backfire preventing apparatus including powder sintered material and disposed at an exit of an anode gas exhaust passage which is connected to the inside of the anode current collector, and (d) a catalyst combustor disposed downstream of the backfire preventing apparatus.

In the above mentioned power generation system, fuel gas flows into the inside of the anode current collector through the reformer, then anode exhaust gas passes through the anode gas exhaust passage and the backfire preventing apparatus and is burned in the catalyst combustor. Combustion exhaust gas flows outside the parallel cells, and then passes around the anode gas intake passage and is exhausted outside. Thus, it is possible to make a fuel cell and a reformer to be integrated each other and to supply anode gas reformed in the reformer directly to each of the cells. Combustible ingredients contained in anode exhaust gas is burned in the catalyst combustor to thereby produce high temperature cathode gas, which is in turn supplied to outside of the cathode current collector of the fuel cell. It is also possible to externally heat the reformer with the combustion gas to thereby indirectly heat the reforming catalyst. Thus, the present invention provides a simple and compact power generation system at low cost.

In a preferred embodiment, the power generation system further includes an air preheater and a steam generator both disposed downstream of the reformer and heated by combustion gas, and the power generation system is disposed in a single container. This embodiment makes it possible to unify an overall power generation system including a fuel cell into a single piece and make the power generation system compact in structure.

The above mentioned molten carbonate fuel cell and the power generation system including the fuel cell provides the following advantages.

It is possible to remarkably reduce the fabrication cost, because it is no longer necessary to use a, separator which was indispensable in a conventional fuel cell. In addition, it is possible to make a fuel cell and a reformer integrated with each other and make a whole plant compact by simplifying a system, both contributing to cost down.

It is now possible to exchange inferior cells to new ones and to supplement electrolyte, to cells to thereby enhance performance of a cell and lengthen the lifetime of a cell, improving commercial availability.

Thus, a molten carbonate fuel cell made in accordance with the present invention is capable of making a cell at low cost without using a high cost separator, exchanging each of cells, and supplementing electrolyte to a cell. A power generation system using the above mentioned fuel cell makes a fuel cell and a reformer integrated each other to thereby make the power generation system simple and compact in structure and reduce fabrication cost thereof.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 3:
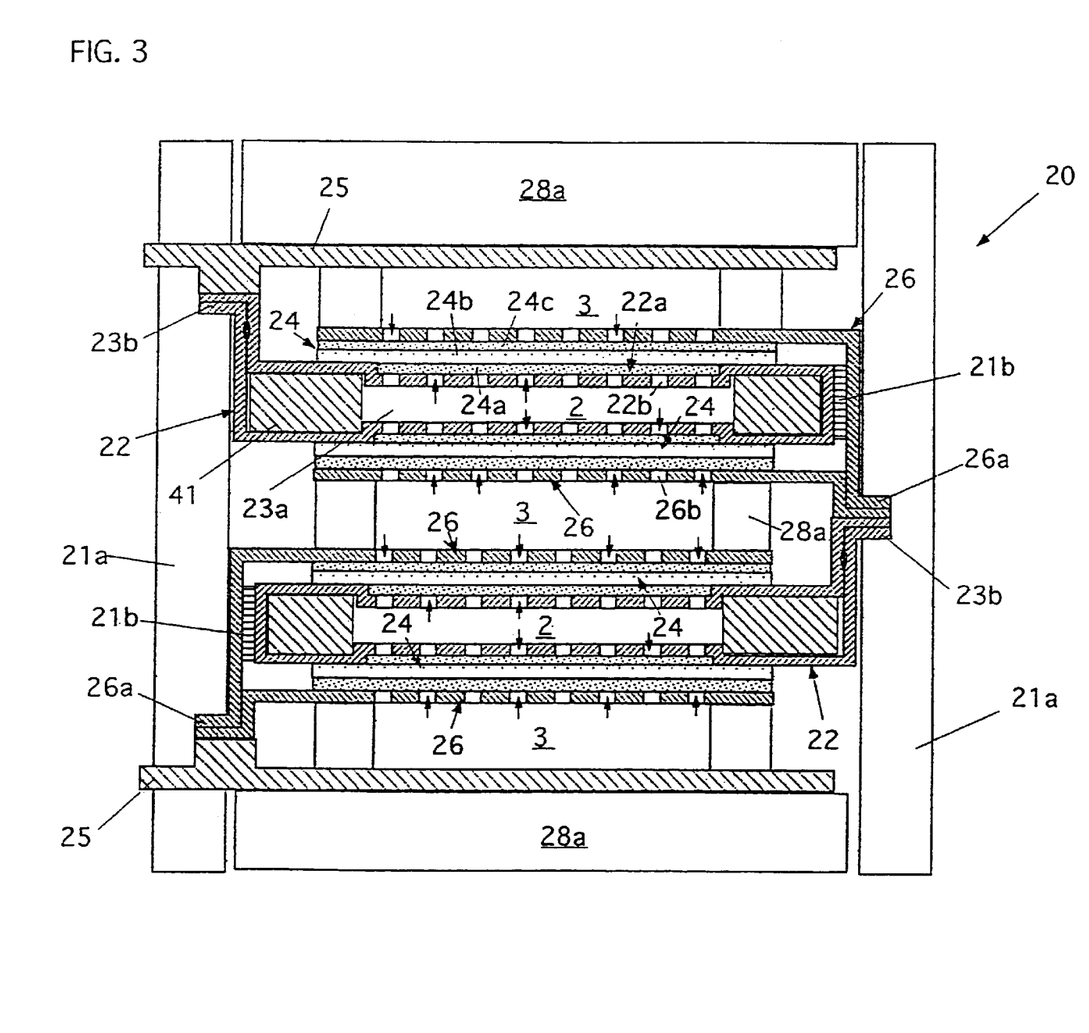
FIG. 3 is a cross-sectional view of a molten carbonate fuel cell made in accordance with the present invention.

FIG. 3 illustrates a molten carbonate fuel cell 20 made in accordance with the embodiment of the present invention.

The fuel cell 20 includes a rectangular-shaped anode current collector 22 formed to be flat rectangular tubular, a pair of cells 24 each disposed on each of outer surfaces of the anode current collector 22, and a pair of cathode current collectors 26 each cooperating with the anode current collector 22 to sandwich each of the cells 24 therebetween. The anode current collector 22, a pair of the cells 24 and a pair of the cathode current collectors 26 to constitute a pair of independent parallel cells. It should be noted that the anode current collector 22 is not to be limited to a rectangular shape, but may have other shapes if it is formed to be hollow.

The anode current collector 22 has a pair of outer surfaces each formed at the center thereof with a recessed portion 22a for receiving an anode therein. Each of the recessed portion 22a, is formed with a plurality of holes 22b through which anode gas is supplied to anode from inside of the anode current collector 22. The anode current collector 22 includes an anode gas passage 23a which is connected to the inside of the anode current collector 22 at opposite ends thereof and through which an anode gas is to be provided to the inside of the anode current collector 22, and an anode current terminal 23b formed at an end of the anode current collector 22 perpendicular to the anode gas flow.

Each of the cells 24 has a pair of anodes 24a each set in the recessed portion 22a of the anode current collector 22, a pair of electrolyte plates 24b each disposed in contact with an outer surface of the anode 24a and extensive over the recessed portion 22a of the anode current collector 22, and a pair of cathodes 24c each disposed in contact with an outer surface of the electrolyte plate 24b. The recessed portion 22a of the anode current collector 22 is rectangular in shape, and each of the anodes 24 has a rectangular shape to completely fit into the recessed portion 22a. Thus, it is possible to sandwich the electrolyte plate 24b without any gaps thereby causing crack of the electrolyte plate 24b.

Each of the cathode current collectors 26 is formed with a plurality of holes through which cathode gas is supplied to cathode from outside thereof. The cathode current collectors 26 are connected to each other at ends opposite to the anode current terminal 23b to thereby form ⊐ shape. The cathode current collectors 26 are formed at a connection point as a cathode current terminal 26a.

In the present embodiment, the anode current collector 22 and the cathode current collector 26 are made by pressing a thin metal plate, and these current collectors 22, 26 are made of material having high corrosion resistance and high electrical conductivity such as nickel and stainless steel. By making the current collectors 22 and 26 of pressed thin metal plate, it is possible to fabricate the current collectors 22 and 26 at lower cost. Two metal plates of which the anode current terminal 23b of the anode current collector 22 is comprised are connected to each other by resistance welding or others to thereby prevent leakage of fuel gas. The anode current collector 22 is filled with filler 41 such as heat insulating material except the anode gas passage 23a, thereby preventing gas flow therethrough.

As illustrated in FIG. 3, the anode current collectors 22 are in contact with current collecting plates 25, and are surrounded with heat and electric insulators 21a and heat and electricity insulators 28a. Electric insulators 21b prevent the anode and cathode current collectors 22 and 26 from contacting to each other. There may be formed space where the insulators 21b exist for electrically insulating the anode and cathode current collectors 22 and 26 from each other.

In accordance with the above mentioned fuel cell 20, a pair of the cells 24 each including the anode 24a, the electrolyte plate 24b, and the cathode 24c are sandwiched between the single, flat, rectangular tubular shaped anode current collector 22 and a pair of the cathode current collectors 26 to thereby constitute a pair of independent parallel cells. Anode gas is supplied inside the anode current collector 22, and cathode gas is supplied outside the cathode current collector 26. Accordingly, the hollow anode current collector 22 itself in cooperating with electrolyte plate has a function of not to mix those two gases each other, and hence it is no longer necessary to use a separator like a conventional fuel cell. In addition, since the anode current collector 22 in cooperating with electrolyte plate has a function of separately supplying those two gases, it is no longer necessary to use an internal manifold like a conventional fuel cell. Thus, it is now possible to construct a cell in relatively simple structure at lower cost without using a separator which would increase fabrication cost. That is, each of the cells is in the form of a square cross-sectional pipe, and fuel gas or anode gas 2 all flows inside the cell, whereas oxidant gas or cathode gas 3 all flows outside the cell. Thus, since the oxidant gas flows only outside the cell, it is no longer necessary to use a separator for preventing mixture of fuel gas and oxidant gas.

Each of a pair of the parallel cells 20 is mechanically independent with each other, and each pair has the anode current terminal 23b and the cathode current terminal 26a. Thus, even after temperature is raised and thus a electrolyte plate is molten to thereby form a wet seal, it is possible to readily exchange a pair of parallel cells to another. In addition, it is possible to supplement electrolyte (which is powder at room temperature) to each of cells through the holes 26b formed at the cathode current collector 26 when a pair of the parallel cells 20 is to be exchanged. That is, an anode and a cathode of each of the cells are electrically connected through interconnectors or current terminals, and hence, each of the cells can be independent by unfastening the interconnectors or current terminals. Thus, it is possible to accomplish maintenance for cells such as exchanging inferior cells with normal cells and supplementing electrolyte to cells.

Figure 4A:
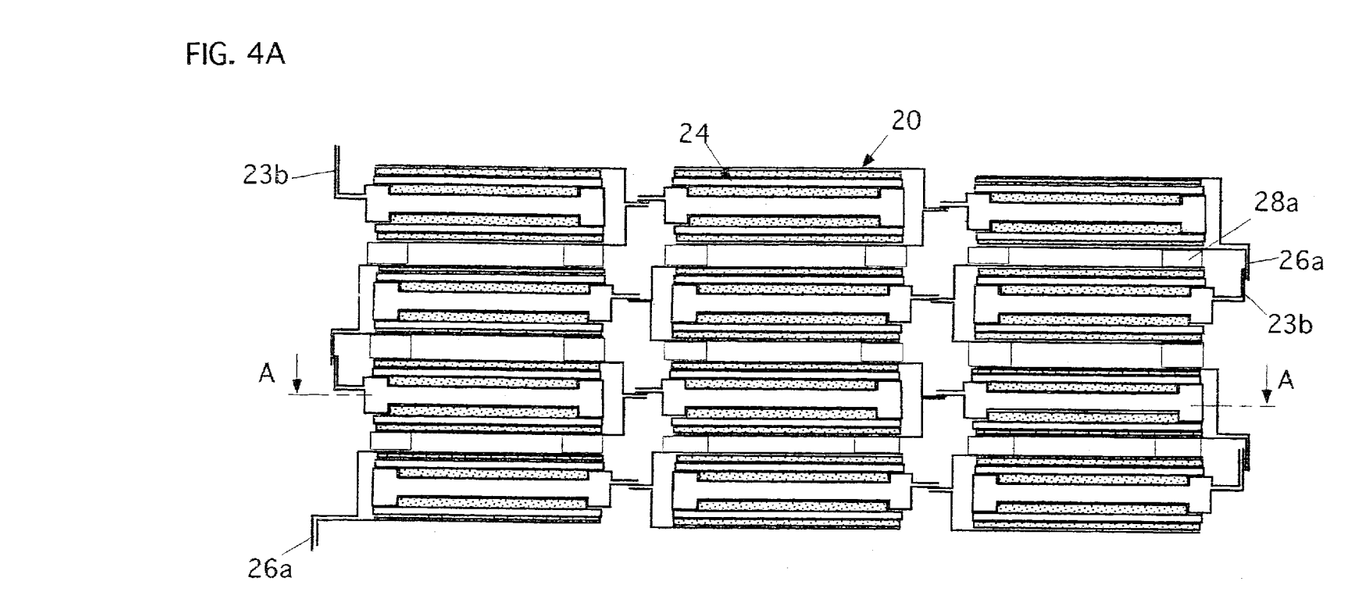
FIG. 4A is a schematic view illustrating how a plurality of the fuel cells are connected to one another.
Figure 4B:
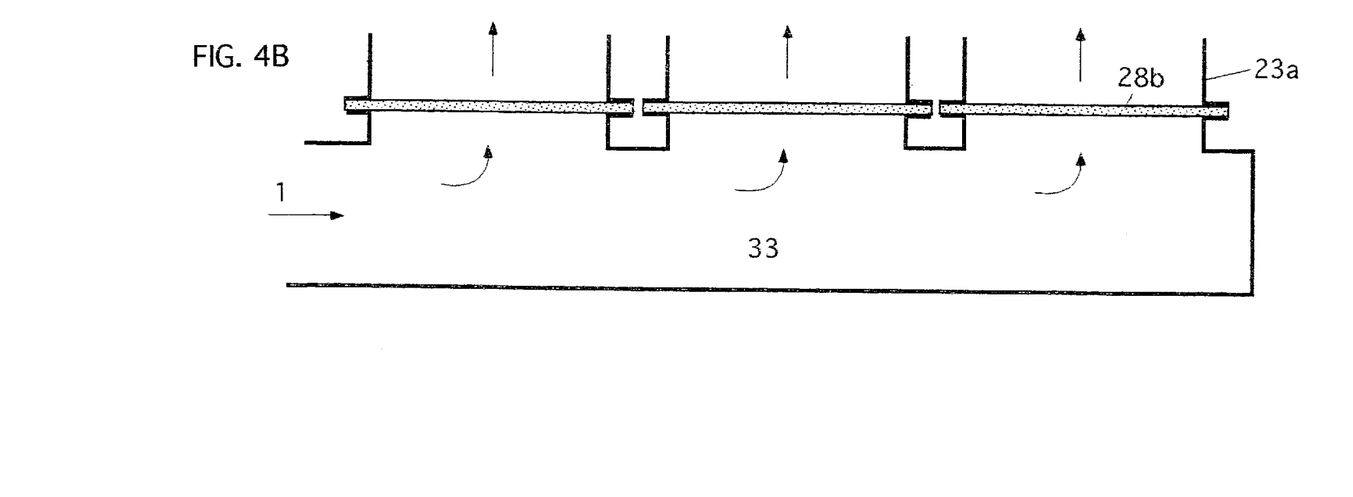
FIG. 4B is a cross-sectional view taken along the line A—A in FIG. 4A.

FIGS. 4A and 4B show how the cells are connected to one another in the fuel cell 20 illustrated in FIG. 3. As illustrated, the fuel cells 20 are stacked one on another through spacers 28a made of heat and electric insulating material, and the anode current terminal 23b of the fuel cell 20 is connected to the cathode current terminal 26a of the adjacent fuel cell 20. That is, since it is possible to increase a voltage without increasing a current, electrical loss can be reduced both inside and outside the stacked fuel cells.

As illustrated in FIG. 4A, a plurality of the parallel cells 20 are arranged so that the anode current terminal 23b of a pair of the parallel cells is connected to the cathode current terminal 26a of an adjacent pair of the parallel cells and the cathode current terminal 26a of a pair of the parallel cells is connected to the anode current terminal 23b of an another adjacent pair of the parallel cells. Namely, the current terminals are vertically disposed alternately in opposite directions. Thus, it is possible to readily connect the vertically arranged current terminals to each other. As illustrated in FIG. 4B, a header 33 is electrically insulated from the anode gas passages 23a through insulators 28b to thereby prevent current leakage out of the header 33.

Figures 5A, 5B, 5C, 5D:
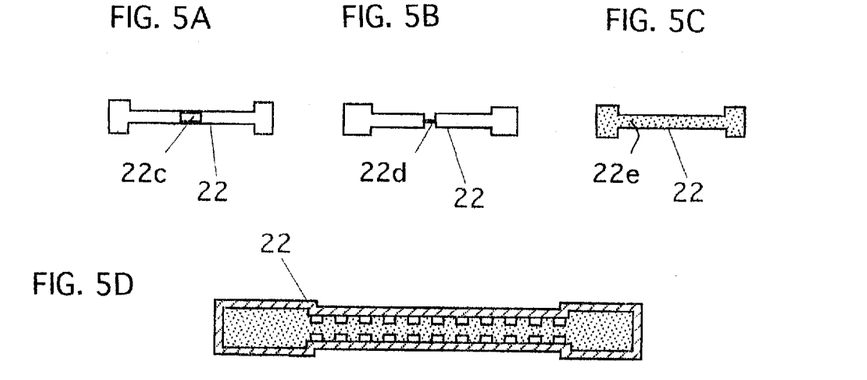
FIGS. 5A, 5B, 5C and 5D are schematic views illustrating examples of support structures for clamping pressure loaded to anode current collector.

FIGS. 5A to 5D, 6A, 6B and 7A to 7C show various alternatives or modifications of the above mentioned embodiment. Each of the cells 24 is preferably loaded with clamping pressure, for instance, in the range of about 2 to about 3 kg/ cm². To this end, the anode current collector 22 is designed to have a width for keeping the above mentioned range of clamping pressure, or to have a support 22c intermediate thereof, as illustrated in FIG. 5A. As an alternative, the anode current collector 22 may be formed with a raised portion 22d for support as illustrated in FIG. 5B, or the anode current collector 22 may be filled with reforming catalyst 22e as illustrated in FIG. 5C.

By disposing the reforming catalyst with-in the anode current collector 22, it is possible to reform fuel gas into hydrogen containing anode gas in the anode current collector 22, thereby providing an internal reforming type fuel cell. Though it is impossible to exchange catalyst in a conventional internal reform type fuel cell, it is possible to exchange the reforming catalyst in the present invention. As illustrated in FIG. 5D, for instance, the reforming catalyst is preferably shaped so as to act as a reinforcement for the anode current collector durable for clamping cells and establish gas flow along the anode.

Figure 6A:
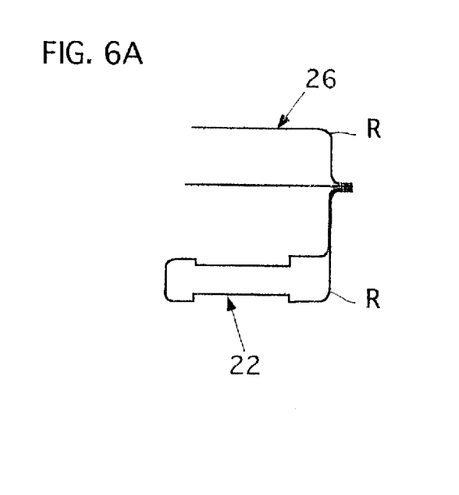
FIGS. 6A and 6B are schematic views illustrating variation of a direction in which cells are stacked.
Figure 6B:
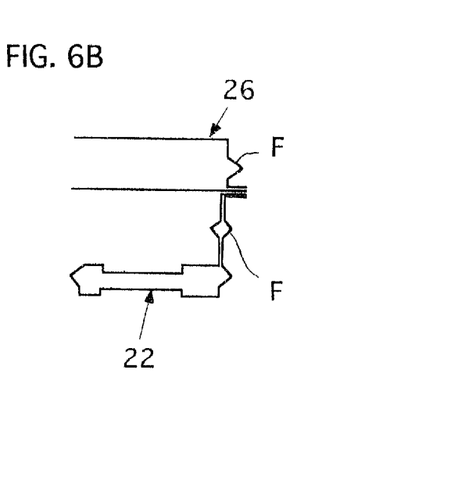

It is preferable for the fuel cell 20 to be flexible to variation in thickness of the cells 24, namely for deformation of the cells in a cell-stacked direction. Thus, the anode and/or cathode current collectors 22 and 26 may have relatively large rounded corners R as illustrated in FIG. 6A, or may have deflected portions F as illustrated in FIG. 6B.

Figure 7A:
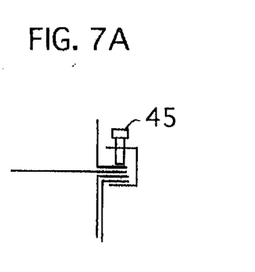
FIGS. 7A, 7B and 7C are schematic views illustrating transformable structure of anode and cathode current collectors to get good contact of each cell component.
Figure 7B:
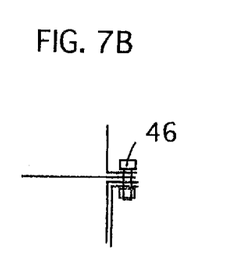
Figure 7C:
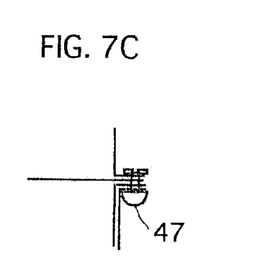

The anode and cathode current terminals 23b and 26b may be connected to each other through a fastener 45 as illustrated in FIG. 7A, a bolt 46 as illustrated in FIG. 7B, or a split pin 47 as illustrated in FIG. 7C. As an alternative, there may be interposed electrically conductive and relatively deformable material (not illustrated) between the anode and cathode current terminals 23b and 26a.

Figure 8:
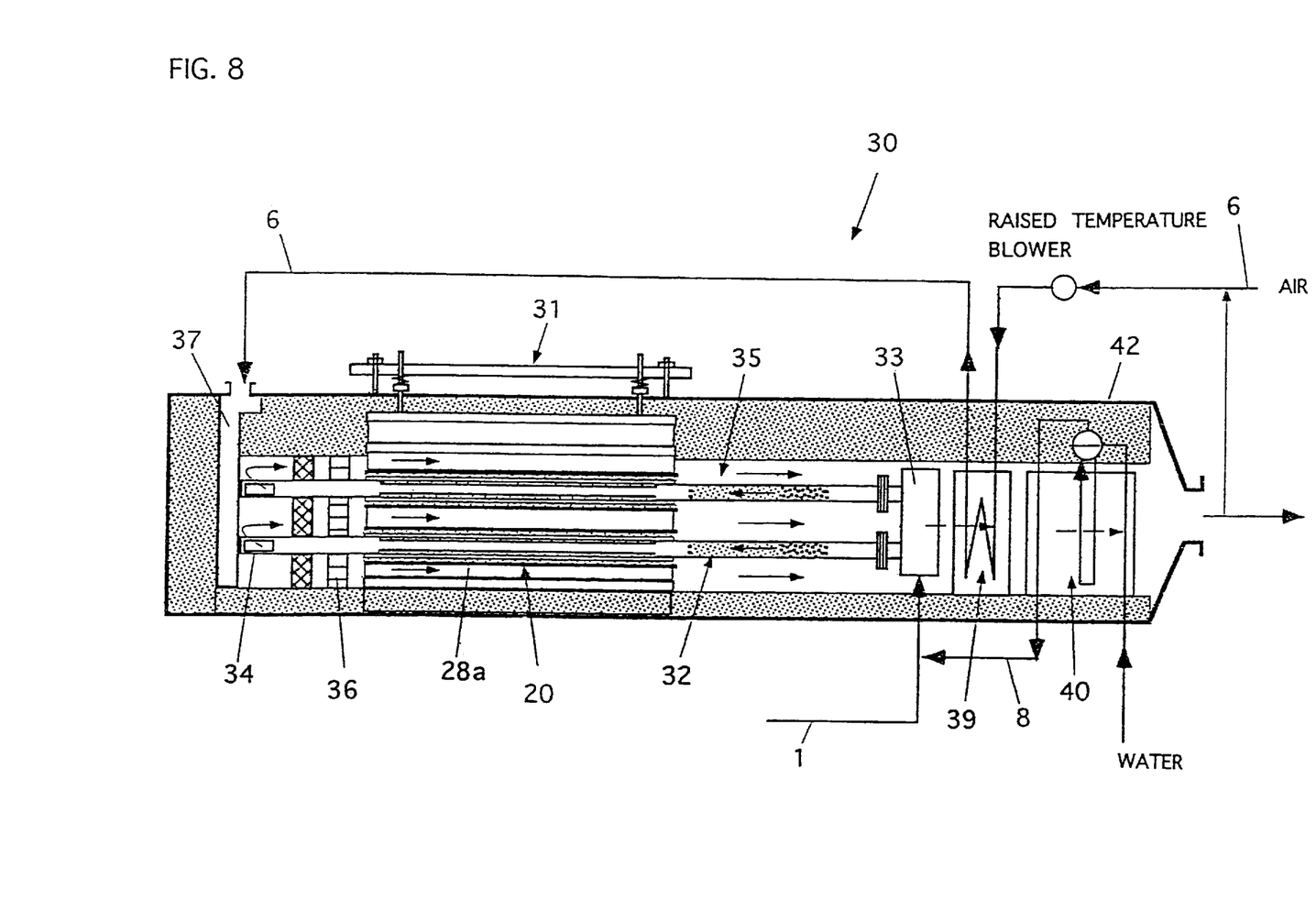
FIG. 8 is a cross-sectional view of a power generation system made in accordance with the present invention.
Figure 9:
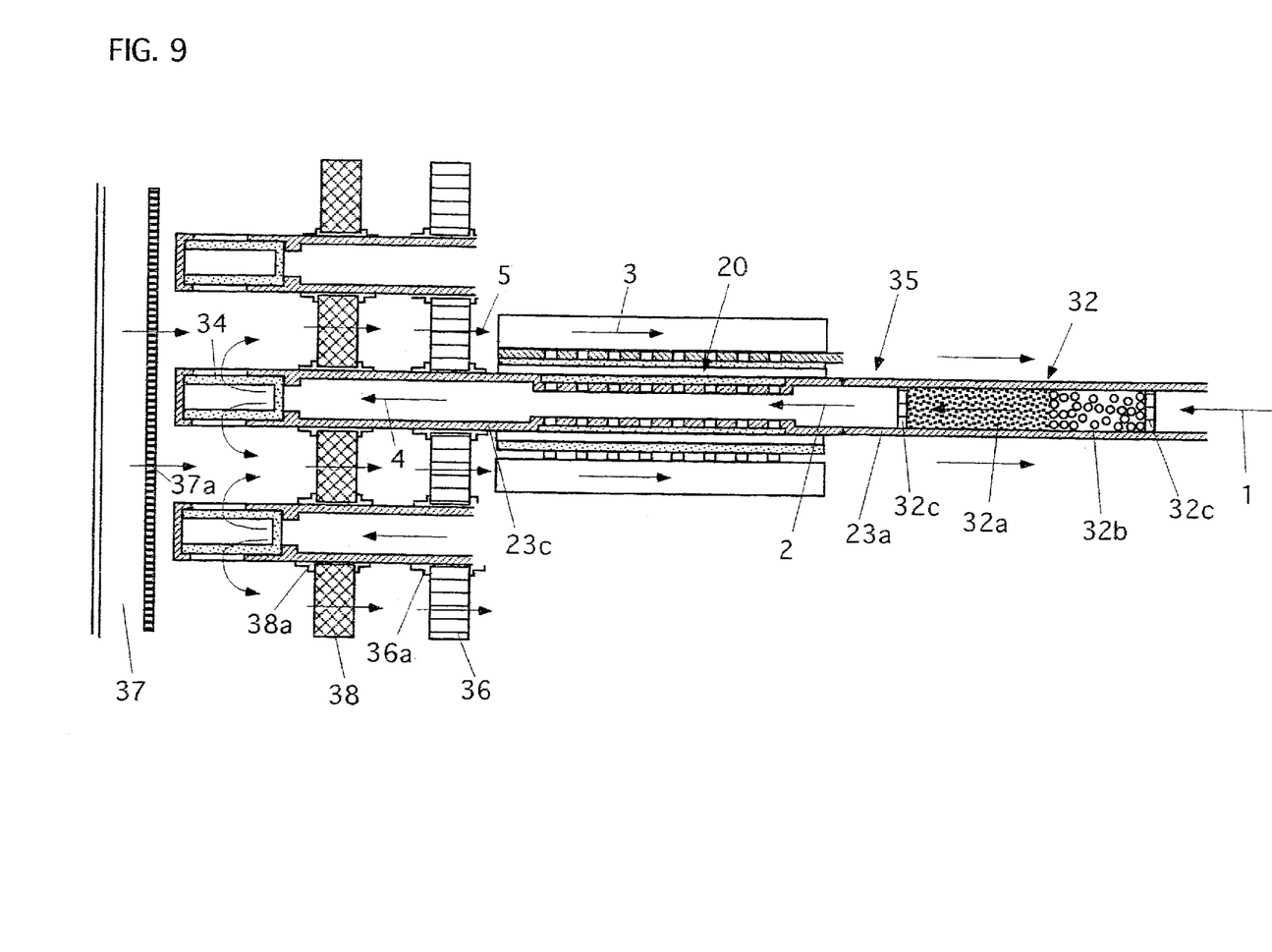
FIG. 9 is an enlarged view of a part of the power generation system illustrated in FIG. 8.

FIG. 8 illustrates a power generation system 30 which includes the above mentioned molten carbonate fuel cell 20, and a part of which is enlarged in FIG. 9. As illustrated in FIG. 8, the power generation system 30 in accordance with the present invention includes a reformer-fuel cell unit 35 having the fuel cell 20 as mentioned above, a reformer 32 and a backfire preventing apparatus 34 all of which are integrated, and a catalyst combustor 36 disposed around the reformer-fuel cell unit 35. A plurality of the parallel cells constituting the fuel cell 20 can be uniformly and wholly tightened through heat and electric insulating material 28a by means of a clamping device 31.

As illustrated in FIG. 9, the reformer 32 has reforming catalyst 32a in the anode gas intake passage 23a which is connected to the anode current collector 22. The reforming zone 32a is heated by combustion gas flowing outside the anode gas intake passage 23a to thereby reform the fuel gas 1 flowing therein to the anode gas 2. The anode gas intake passage 23a also contains alumina balls 32b adjacent to the reforming catalyst 32a. There are provided catalyst stoppers 32c in the anode gas intake passage 23a in order to prevent the reforming catalyst 32a and the alumina balls 32b from flowing away.

The backfire preventing apparatus 34 is disposed at an exit of the anode gas exhaust passage 23c which is connected to the anode current collector 22, and is made of powder sintered material. The backfire preventing apparatus 34 not only prevents occurrence of backfire but also disperses and emits anode exhaust gas 5. The anode exhaust gas 5 emitted out of the backfire preventing apparatus 34 flows backward outside the anode gas exhaust passage 23c together with air flowing out of air blowout holes 37a of an air distribution chamber 37.

The catalyst combustor 36 is disposed downstream of the backfire preventing apparatus 34 so that the catalyst combustor 36 partitions the outside of the anode gas exhaust passage 23c. As illustrated in FIG. 9, it is preferable to dispose a second backfire preventing apparatus 38 between the first backfire preventing apparatus 34 and the catalyst combustor 36. The catalyst combustor 36 and the second backfire preventing apparatus 38 are set at outside of the anode gas exhaust passage 23c by means of clamps 36a and 38a, respectively.

In the above mentioned power generation system 30, the fuel gas 1 flows into the inside of the anode current collector 22 through the reformer 32, then the anode exhaust gas 4 passes through the anode gas exhaust passage 23c and the backfire preventing apparatuses 34, 38 and is burned in the catalyst combustor 36. The combustion gas 5 flows outside the parallel cells 20, and then passes around the anode gas intake passage 23a and is exhausted outside. Thus, it is possible to make the fuel cell 20 and the reformer 32 to be integrated with each other, and supply the anode gas 2 reformed in the reformer 32 directly to each of the cells. Not yet combustible ingredients contained in the anode exhaust gas 4 is burned in the catalyst combustor 36 to thereby produce the high temperature cathode gas 3, which is in turn supplied to outside of the cathode current collector 26 of the fuel cell 20. Then, the reformer 32 is externally heated with the combustion gas 5 to thereby indirectly heat the reforming zone 32a. Thus, the embodiment provides a simple and compact power generation system at low cost.

Referring back to FIG. 8, the power generation system 30 may further include an air preheater 39 and a steam generator 40 both disposed downstream of the reformer and heated by the combustion gas 5. The power generation system 30 is disposed in a single container 42. This embodiment makes it possible to unify the overall power generation system including the fuel cell into a single structure and make it compact in structure.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A molten carbonate fuel cell comprising:
 (a) an anode current collector comprising: (i) an enclosure having a rectangular shape in cross section which defines an inside space and wherein said enclosure directs gas flow within the inside space, two opposite lateral sides, and a pair of opposite exterior surface portions in a spaced-apart, parallel relationship to each other, each exterior surface portion having a recessed portion for receiving an anode, the recessed portion having a plurality of holes formed therein for communicating gas from the inside space, (ii) an anode gas passage for communicating anode gas to the inside space of the anode current collector, and (iii) an anode terminal formed at one end of the anode current collector;
 (b) a pair of cells, each cell disposed in electrical contact with one or the other of said exterior surface portions of the anode current connector, and each cell having (i) an anode having a flat plate structure of rectangular cross section, a pair of opposite lateral edges, and a pair of opposite major surfaces, wherein said anode is disposed in the recessed portion of the anode current collector and wherein a first major surface of said anode faces the anode current collector and a second major surface of said anode faces away from the anode current collector, (ii) an electrolyte plate having a flat plate structure of rectangular cross section and a pair of opposite major surfaces, wherein a first major surface of said electrolyte plate is in electrical contact with the second major surface of the anode and extends laterally beyond the lateral edges of the anode to electrically contact one of said exterior surface portions of the anode current collector, and a second major surface of said electrolyte plate faces away from said anode, and (iii) a cathode having a flat plate structure of rectangular cross-section and a pair of opposite major surfaces including a first major surface in electrical contact with the second major surface of the electrolyte plate and a second major surface of the cathode facing away from the electrolyte plate; and
 (c) a pair of cathode current collectors, each cathode current collector in electrical contact with the second major surface of the cathode of each cell to thereby sandwich each cell of said pair of cells between one of said cathode current collectors and one of said exterior surfaces of the anode current collector, wherein the cathode current collectors are connected at an end opposite the terminal of the anode current collector.

2. A molten carbonate fuel cell as set forth in claim 1, wherein a plurality of holes are provided in each of the cathode current collectors to communicate cathode gas from outside each cathode current collector to the cathode in electrical contact therewith.

3. A molten carbonate fuel cell as set forth in claim 2, wherein the anode current collector has a flattened rectangular shape in cross section.

4. A molten carbonate fuel cell as set forth in claim 1, wherein said recessed portion of the anode current collector is rectangular and said anode fits completely within the recessed portion.

5. A molten carbonate fuel cell as set forth in claim 1, wherein said anode current collector and said cathode current collector comprise metal plates.

6. A molten carbonate fuel cell as set forth in claim 1, further comprising reforming catalyst disposed in said inside space of the anode current collector.

7. A molten carbonate fuel cell as set forth in claim 1, wherein said anode and cathode current collectors comprise a material having corrosion resistance and electrical conductivity.

8. A molten carbonate fuel cell assembly, comprising:
 a plurality of stacked, carbonate fuel cells connected electrically; and
 a plurality of electrically insulating spacers separating the stacked cells; and
 wherein each of the carbonate fuel cells comprises:
  (a) an anode current collector comprising: (i) an enclosure having a rectangular shape in cross section which defines an inside space and wherein said enclosure directs gas flow within the inside space, two opposite lateral sides, and a pair of opposite exterior surface portions in a spaced-apart, parallel relationship to each other, each exterior surface portion having a recessed portion for receiving an anode, the recessed portion having a plurality of holes formed therein for communicating gas from the inside space, (ii) an anode gas passage for communicating anode gas to the inside space of the anode current collector, and (iii) an anode terminal formed at one end of the anode current collector;

(b) a pair of cells, each cell disposed in electrical contact with one or the other of said exterior surface portions of the anode current connector, and each cell having (i) an anode having a flat plate structure of rectangular cross section, a pair of opposite lateral edges, and a pair of opposite major surfaces, wherein said anode is disposed in the recessed portion of the anode current collector and wherein a first major surface of said anode faces the anode current collector and a second major surface of said anode faces away from the anode current collector, (ii) an electrolyte plate having a flat plate structure of rectangular cross section and a pair of opposite major surfaces, wherein a first major surface of said electrolyte plate is in electrical contact with the second major surface of the anode and extends laterally beyond the lateral edges of the anode to electrically contact one of said exterior surface portions of the anode current collector, and a second major surface of said electrolyte plate faces away from said anode, and (iii) a cathode having a flat plate structure of rectangular cross-section and a pair of opposite major surfaces including a first major surface in electrical contact with the second major surface of the electrolyte plate and a second major surface of the cathode facing away from the electrolyte plate; and (c) a pair of cathode current collectors, each cathode current collector in electrical contact with the second major surface of the cathode of each cell to thereby sandwich each cell of said pair of cells between one of said cathode current collectors and one of said exterior surfaces of the anode current collector, wherein the cathode current collectors are connected at an end opposite the terminal of the anode current collector.

9. An assembly according to claim 8, wherein a plurality of holes are provided in each of the cathode current collectors to communicate cathode gas from outside each cathode current collector to the cathode in electrical contact therewith.

10. An assembly according to claim 9, wherein the anode current collector is a flattened rectangular shape in cross section.

11. An assembly according to claim 8, comprising adjacent first, second, and third fuel cells, wherein the anode current terminal of the first fuel cell is connected to the cathode terminal of the second fuel cell, and the anode terminal of the second fuel cell is connected to the cathode terminal of the third cell.

12. An assembly according to claim 8, wherein said anode and cathode current, collectors comprise a material having high corrosion resistance and electrical conductivity.

13. An assembly according to claim 8, further comprising heat insulating material in said inside space of the anode current collector.

14. A power generation system, comprising:
(1) a plurality of molten carbonate fuel cells, each cell including
    (a) an anode current collector comprising: (i) an enclosure having a rectangular shape in cross section which defines an inside space and wherein said enclosure directs gas flow within the inside space, two opposite lateral sides, and a pair of opposite exterior surface portions in a spaced-apart, parallel relationship to each other, each exterior surface portion having a recessed portion for receiving an anode, the recessed portion having a plurality of holes formed therein for communicating gas from the inside space, (ii) an anode gas passage for communicating anode gas to the inside space of the anode current collector, and (iii) an anode terminal formed at one end of the anode current collector;

(b) a pair of cells, each cell disposed in electrical contact with one or the other of said exterior surface portions of the anode current connector, and each cell having (i) an anode having a flat plate structure of rectangular cross section, a pair of opposite lateral edges, and a pair of opposite major surfaces, wherein said anode is disposed in the recessed portion of the anode current collector and wherein a first major surface of said anode faces the anode current collector and a second major surface of said anode faces away from the anode current collector, (ii) an electrolyte plate having a flat plate structure of rectangular cross section and a pair of opposite major surfaces, wherein a first major surface of said electrolyte plate is in electrical contact with the second major surface of the anode and extends laterally beyond the lateral edges of the anode to electrically contact one of said exterior surface portions of the anode current collector, and a second major surface of said electrolyte plate faces away from said anode, and (iii) a cathode having a flat plate structure of rectangular cross-section and a pair of opposite major surfaces including a first major surface in electrical contact with the second major surface of the electrolyte plate and a second major surface of the cathode facing away from the electrolyte plate;

(c) a pair of cathode current collectors, each cathode current collector in electrical contact with the second major surface of the cathode of each cell to thereby sandwich each cell of said pair of cells between one of said cathode current collectors and one of said exterior surfaces of the anode current collector, wherein the cathode current collectors are connected at an end opposite the terminal of the anode current collector;

(2) a reformer, including reforming catalyst, disposed in the anode gas passage;

(3) a backfire prevention apparatus, including powder sintered material disposed in said anode exhaust gas passage; and (4) a catalyst combustor, disposed downstream of said backfire prevention apparatus and upstream of the outer surface of the cathode current collector, for combusting anode exhaust gas and producing combustion cathode gas for delivery to the outer surface of the cathode current collector.

15. A power generation system as in claim 14, wherein a plurality of holes are provided in each of the cathode current collectors to communicate cathode gas from outside each cathode current collector to the cathode in electrical contact therewith.

16. A power generation system according to claim 14, wherein said reformer is heated by combustion gas down stream of said outer surface of the cathode current collector, and further comprising an air preheater and a steam generator disposed downstream of said reformer with respect to the combustion gas.

17. A power generation system according to claim 14, comprising first and second molten carbonate fuel cells, wherein the cathode terminal of the first cell is connected to the anode terminal of the second cell.

18. A power generation system according to claim 14, wherein said recessed portion of the anode current collector is rectangular and said anode fits completely within the recessed portion.

19. A power generation system according to claim 14, wherein said anode current collector and said cathode current collector comprise metal plates.

* * * * *